(12) United States Patent  (10) Patent No.: US 7,954,323 B2
Bellows et al.  (45) Date of Patent: Jun. 7, 2011

(54) METHOD OF INCREASING SERVICE INTERVAL PERIODS IN A STEAM TURBINE

(75) Inventors: James C. Bellows, Maitland, FL (US); Sudhir Rajagopalan, Chuluota, FL (US); James W. Dorow, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 254 days.

(21) Appl. No.: 12/055,490

(22) Filed: Mar. 26, 2008

(65) Prior Publication Data

US 2009/0241544 A1  Oct. 1, 2009

(51) Int. Cl.
*F01K 23/06* (2006.01)
*E01B 9/10* (2006.01)
*F16B 35/00* (2006.01)
*F16B 43/00* (2006.01)

(52) U.S. Cl. ............... 60/670; 411/378; 411/914

(58) Field of Classification Search ......... 427/404, 427/405, 455, 456; 416/241 R, 241 A, 241 B; 411/372.5, 372.6, 373–426, 914, 915; 277/628–654
See application file for complete search history.

(56) References Cited

U.S. PATENT DOCUMENTS

| | | | | |
|---|---|---|---|---|
| 3,298,272 | A * | 1/1967 | Henderson | 411/373 |
| 4,890,967 | A * | 1/1990 | Rosenbaum | 411/377 |
| 6,755,613 | B1 * | 6/2004 | Schmitz | 415/200 |
| 6,964,554 | B2 * | 11/2005 | Groenendaal et al. | 415/202 |
| 2004/0208726 | A1 * | 10/2004 | Bohme et al. | 411/411 |

* cited by examiner

*Primary Examiner* — Thomas E Denion
*Assistant Examiner* — Christopher Jetton

(57) ABSTRACT

A method of increasing service interval periods in a steam turbine by neutralizing sodium hydroxide in contaminated steam in a high temperature and a high pressure portion of a steam turbine by placing a protective covering over at least a portion of each of the bolts of a nozzle block assembly. The protective covering neutralizes contaminants in contaminated steam to reduce stress cracking of the bolts during steam turbine operation, and thus extend the useful life of the bolts and reduce the need for service work to repair or replace damaged bolts.

20 Claims, 11 Drawing Sheets

US 7,954,323 B2

METHOD OF INCREASING SERVICE INTERVAL PERIODS IN A STEAM TURBINE

BACKGROUND

1. Technical Field

This application relates generally to the field of steam turbines and a method of increasing service interval periods in a steam turbine.

2. Background Information

Large steam turbines are currently used in electric power plants all around the world for generation of electric power. Such steam turbines often include a high pressure turbine section, an intermediate pressure turbine section, and a low pressure turbine section. In the high pressure turbine section, the steam passing through can often be at very high temperatures, as well as be under very high pressures. Consequently, the components of the high pressure turbine section, and the components of the intermediate and low pressure turbine sections, are subjected to stresses.

One such component is a nozzle block assembly. The nozzle block assembly in a steam turbine directs the flow of steam before the steam contacts the first row of rotating blades. The nozzle block assembly is positioned downstream of the steam inlet nozzle chamber and upstream of the first row of rotating blades. The steam passing through the nozzle block assembly in the high pressure turbine section, for example, has a very high temperature and is under a very high pressure, which temperature and pressure are higher or about the same as that of steam in portions of the steam turbine system located downstream of the high pressure turbine section. The nozzle block assembly in the high pressure turbine section is often held together and attached onto a stationary portion of the steam turbine system by bolts.

Unfortunately, large steam turbines and the components thereof can be contaminated by contaminants, such as alkali metal hydroxides that are present in the water used to produce the steam. Such alkali metal hydroxides may include sodium hydroxide (caustic soda), potassium hydroxide (caustic potash), lithium hydroxide, rubidium hydroxide, and cesium hydroxide. It should be noted that, for purposes of simplicity, sodium hydroxide is primarily discussed in this application as a contaminant. However, it should be understood that any or all of the other alkali metal hydroxides listed, or any other strongly alkaline hygroscopic contaminant, should be considered as possible contaminants, either taken individually or in combination with or excluding sodium hydroxide. Since, over time, steam escapes from the steam turbine system during operation, water must be added to the steam turbine for the generation of more steam. Such contaminants are sometimes introduced into the steam turbine at this time because the replacement water may contain the contaminants. In many modern, high pressure steam turbines, the sodium hydroxide is in a highly concentrated solution at the inlet temperatures of the turbines and can be rather easily spread by the steam throughout the components of the steam turbine system. In some instances, the sodium hydroxide concentration on the parts of the steam turbine may be 90% or greater. Solutions of 90% sodium hydroxide can result in stress corrosion cracking, particularly of high strength materials under stress. The nozzle block bolts, because of the high stresses to which the nozzle block assembly is subjected, are usually made of such high strength materials that are generally susceptible to stress corrosion cracking. Once the corrosion occurs, it is possible to replace the nozzle block bolts. However, unless the steam turbine system has been cleaned of the contamination (a process which can take months or even years), the replacement nozzle block bolts will still be subject to the same sodium hydroxide contamination in the steam turbine system that compromised the original bolts. The replacement parts can then corrode and crack relatively quickly after installation, such as within two or fewer years.

SUMMARY

In an embodiment, the invention includes a method of increasing service interval periods in a steam turbine, upon alkali metal hydroxide contaminated water being injected into the steam cycle thereby producing steam contaminated with at least one alkali metal hydroxide, by reducing an amount of the alkali metal hydroxide in the steam in a relatively high temperature and relatively high pressure portion of said steam turbine and converting at least one alkali metal hydroxide in contaminated steam into a non-corrosive compound by modifying a nozzle block assembly mounted to a stationary portion in said steam turbine. The nozzle block assembly comprises a nozzle block comprising flow passages for guiding a flow of the steam from a nozzle chamber to a first row of rotating steam turbine blades; said nozzle block having a plurality of holes disposed therein; a plurality of bolts passing through said holes to fasten said nozzle block to said stationary portion of said steam turbine; and each of said bolts comprising at least a head portion and a threaded portion. The method comprises disposing a protective getter proximate at least one of said bolts, said getter configured for converting at least a portion of the at least one alkali metal hydroxide into an aluminum compound effective to neutralize at least a portion of the at least one alkali metal hydroxide in the steam at said portion of said nozzle block assembly adjacent said bolts so as to reduce stress corrosion cracking of said bolts during steam turbine operation over a substantial number of hours of operation of said steam turbine.

In another embodiment, the invention includes a steam turbine nozzle block assembly including a nozzle block comprising a plurality of vanes defining flow passages for guiding steam from a nozzle chamber passage to a first row of rotating steam turbine blades and a plurality of holes. The invention also includes a plurality of bolts for passing through said holes to fasten said nozzle block to a stationary portion of a steam turbine; each of said bolts comprising a head portion, a threaded portion, and a shank portion between said head portion and said threaded portion. The invention also a protective getter disposed proximate at least one of said bolts, said protective getter configured for converting a portion of alkali metal hydroxide contaminants present in the steam into an aluminum compound effective to neutralize the portion of the alkali metal hydroxide contaminants at said bolts so as to reduce stress corrosion cracking of said bolts during steam turbine operation over a substantial number of hours.

DESCRIPTION OF EMBODIMENT OR EMBODIMENTS

Figure 1:
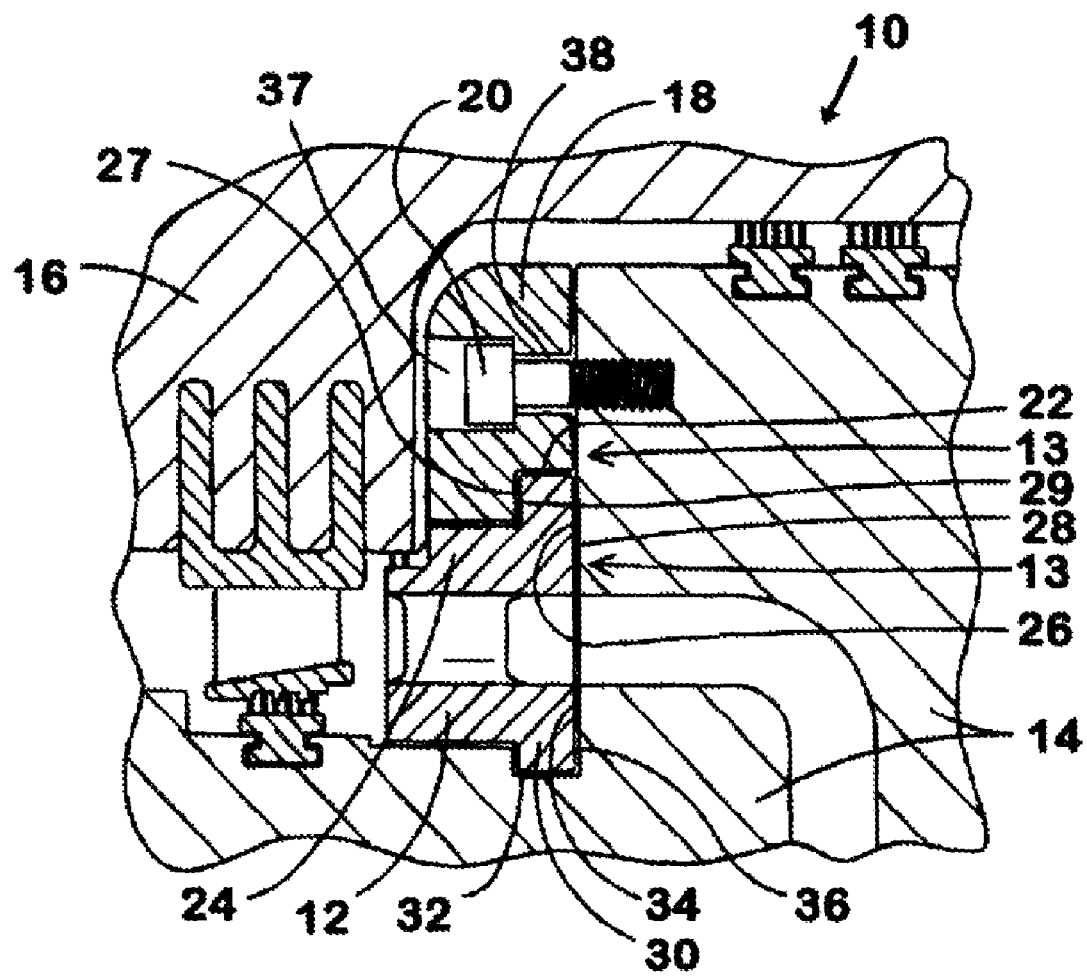
FIG. 1 shows a partial sectional view of a steam turbine with a bolted nozzle block assembly.

In one embodiment, a sacrificial barrier, or getter, can be used to minimize or reduce the attack by sodium hydroxide on the high strength components of the steam turbine, and also other susceptible components of the steam turbine. Metallic aluminum, for example, is readily attacked by sodium hydroxide, which results in the consumption of the sodium hydroxide and the creation of aluminum compounds containing oxygen, such as aluminum oxide, aluminum hydroxide, or aluminate, which are benign to the metals often used in making high strength components, such as nozzle block bolts. By creating a shield of aluminum, the quantity of sodium hydroxide that can come in contact with the high strength alloys from which the components are made can be minimized, possibly to the point of no contact whatsoever. If sodium hydroxide is present, it reacts first with the aluminum and is consumed. Only when most of the aluminum is consumed can the sodium hydroxide reach the part itself to cause stress corrosion cracking. In the case of the nozzle block bolts, the bolts would be protected from stress corrosion cracking and thus the useful life of the bolts would be longer than that of unprotected bolts. The extended bolt life would also extend the time interval between necessary service work on the nozzle block assembly and the bolts.

It should be noted that aluminum compounds containing oxygen, such as aluminum oxide or aluminum hydroxide, can be carried in the steam in a steam turbine and deposited on the turbine parts, possibly in a manner similar to silica, as the steam travels through the turbine. It is generally known that when aluminum compounds containing oxygen deposit on turbine parts, a loss of turbine efficiency can occur. However, this problem of aluminum oxide or hydroxide deposition is rarely of concern in the field of steam turbines because the use of aluminum components in steam turbine systems is relatively rare.

On the contrary, in the embodiments described herein, aluminum is used to protect the nozzle block bolts and/or other parts of a steam turbine by consuming and neutralizing sodium hydroxide in steam. There is therefore a concern that the aluminum compounds containing oxygen formed by the consumption of the sodium hydroxide by the aluminum could be carried by the steam and deposited on turbine parts as the steam travels through the turbine. To minimize or prevent deposition of aluminum compounds containing oxygen, the rate at which such aluminum compounds can be transferred to the steam should be controlled or managed in order to minimize the concentration and/or amount of such aluminum compounds carried by the steam. For example, if the rate of transfer is relatively slow and the total amount of such aluminum compounds transferred is spread out over a substantial amount of time, only insignificant amounts of such aluminum compounds will be transferred and present in the steam at any given time. On the other hand, if the rate of transfer of such aluminum compounds is relatively fast and a substantial amount is formed in a short period of time, the concentration of such aluminum compounds in the steam traveling through the turbine will be in a quantity sufficient to deposit on the steam turbine parts in a significant and detrimental amount.

It is believed that one way to reduce the rate of transfer of such aluminum compounds containing oxygen is to simply reduce or minimize the surface area of the aluminum that may be contacted by steam. The less aluminum there is in contact with a main flow of steam at any given time to react with the sodium hydroxide in the steam, the less aluminum compounds containing oxygen will be produced over a period of time, resulting in a relatively small concentration in the steam. Another way to reduce the rate of transfer of such aluminum compounds would be to locate the aluminum farther away from the direct flow of steam where the steam is flowing fast, such as very near the exit of the steam nozzles in the nozzle block. If, for example, the steam is flowing very quickly over the aluminum, a greater amount of steam flows over the aluminum in a given period of time, and thus the rate of consumption of aluminum and the production of such aluminum compounds would be increased. On the contrary, if the aluminum is placed away from the direct flow of steam, that is, in an area where the steam is flowing indirectly and/or at a relatively slower rate, a lesser amount of steam flows over the aluminum in a given period of time, and thus the rate of consumption of aluminum and the production of such aluminum compounds would be decreased.

Therefore, in at least one embodiment, the aluminum should be located so that it is of an amount sufficient to consume or neutralize the sodium hydroxide at a rate which protects the equipment but which avoids the transfer of undesirable amounts of aluminum compounds. Further, the aluminum could be placed such that it blocks or minimizes access of sodium hydroxide to high strength parts, such as the nozzle block bolts, without exposing so much aluminum to the main steam flow that such aluminum compounds are readily dissolved and deposited excessively on the steam turbine parts.

In another embodiment, aluminum coatings can be applied directly to the parts to be protected. Additionally, foil or other aluminum structures could be used to shield the parts. It should be understood that the aluminum could be any grade and/or purity as would be desired, including various commercial or technical grades and reagent grades. In at least one embodiment, the aluminum is of a very high purity, such as at least approximately ninety-five percent pure, or possibly ninety-six, ninety-seven, ninety-eight, or ninety-nine percent pure, or even possibly higher.

One part of a steam turbine that is susceptible to sodium hydroxide corrosion, as discussed above, are the nozzle block bolts in the nozzle block assembly. For example, nozzle block bolts are often attacked by sodium hydroxide just at the junction of the bolt head and shank and/or at the last thread of the screw threading that is engaged or screwed into a corresponding threaded hole, both of which areas are generally subject to the highest stresses. It is believed that the sodium hydroxide attacks the grain boundaries more than the grains themselves in the bolt material. It is further believed that a loss of only a few milligrams of material at the junction of the bolt head and shank and/or at the last engaged thread of the screw threading can result in failure and breakage of the bolt because of the high stresses. The sodium hydroxide could come from the head end of the bolt. In one embodiment, at least a portion of the nozzle block bolt, or possibly the entire nozzle block bolt, can be aluminized, that is, coated or plated with a layer of aluminum. Coating or plating of the nozzle block bolts or portions thereof can be an expensive process, but it also provides intimate contact between the aluminum and the bolt, and electrical conductivity, both of which are desirable. In addition, the coating may provide only a relatively small amount of aluminum, which could lead to lessened duration of protection because the aluminum may be consumed sooner than would be desired. In another embodiment, the shank of the bolt may be wrapped in aluminum foil. In yet another embodiment, the aluminum foil may be wrapped over the aluminum coating or plating already on the bolt to provide two layers of protection.

In one embodiment, the bolt may be wound with aluminum wire, which could be shaped similarly to a bass piano string or wound guitar string. The wire must be restricted to a size sufficient to allow clearance in the bolt hole, and the winding must be restricted to a length that does not compromise the thread engagement of the bolt in the bolt hole. With these restrictions in mind, the wire should still be manufactured to be as heavy as feasible and to cover as much of the bolt as feasible. In another embodiment, flat wire could be used which could allow for more aluminum than rounded wire.

In another embodiment, an aluminum gasket could be placed in an annular groove in the nozzle block and clamped between the nozzle block and the nozzle chamber so that the sodium hydroxide cannot readily pass through the gasket. This could be a crush-type or deformable gasket similar to an o-ring, or it may be a gasket with relatively sharp structures, such as projections from the surface of the gasket, that would crush or deform when the nozzle block is bolted to the nozzle chamber. The gasket could have holes therein which would correspond to each of the bolts and would thereby surround each bolt with protective aluminum. The aluminum should not be on the loaded surface, since it is soft and would not be expected to be stable at the working temperature.

In yet another embodiment, a crushable or deformable washer could be placed about the shaft of the bolt near the bolt head to protect the high-stress transition from bolt shaft to head. This washer may or may not be on the bearing surface, but should be compressed as the bolt is screwed down.

In still another embodiment, a cap or plug may be inserted or wedged into the mouth of the holes in the nozzle block assembly on top of or adjacent the head of the bolt. The outer dimensions of the cap may be sized to match the inner dimensions of the holes to promote a tight, friction fit. The outer dimensions of the cap could also be slightly oversized with respect to the inner dimensions of the hole, and the cap could be forced into the hole to promote a friction fit.

In a further embodiment, the cap could be designed with a recess therein such that the cap fits snugly around and covers the head of the bolt. The inside of the recess in the cap can be sized to substantially match the exterior of the bolt head to promote a friction fit. If the bolt head is seated in a recess in the nozzle block assembly, the thickness of the cap can be selected such that the outer surfaces of the cap substantially match the inner surfaces of the recess to promote a further friction fit.

In another embodiment, the cap could be made entirely of aluminum or aluminum alloy, which would consume the sodium hydroxide approaching the shaft and/or threaded portion of the bolt from the head end of the bolt before the sodium hydroxide reaches and attacks the shaft and/or threaded portion of the bolt. In another embodiment, the cap could be made from nickel alloy or another material that is less or not at all reactive to sodium hydroxide. Such a cap that does not react with sodium hydroxide would act as a physical barrier to prevent sodium hydroxide from approaching or attacking the bolt shaft and threaded portion from the head end of the bolt. Such a cap would also further serve to contain the dispersal of aluminum compounds containing oxygen generated by the consumption of sodium hydroxide by aluminum located on or around the shaft and/or threaded portion of the bolts. As discussed above, by reducing the surface area of the aluminum that may be contacted by steam, the rate of consumption of aluminum and the rate of formation of such aluminum compounds can both be reduced to extend the duration of protection and avoid formation of undesirable amounts of such aluminum compounds.

In one embodiment, the cap fits snugly around the head of the bolt between the head and the inner surface of the recess to form a sufficient friction fit to retain the cap on the bolt head and between the bolt head and the inner surface of the recess. In another embodiment, the cap could be slightly oversized and forced or hammered in between the bolt head and the inner surface of the recess.

In yet another embodiment, the inside of the cap and the outside of the bolt head could each have a complementary threading to permit the cap to be screwed onto the bolt head. In still another embodiment, the outside of the cap and the inside of the recess could each have a complementary threading to permit the cap to be screwed into the recess. In a further embodiment, all four of the aforementioned threadings could be utilized to both screw the cap onto the bolt head and screw the cap into the recess substantially simultaneously.

In one embodiment, the bolts for the nozzle block assemblies in the high pressure section of the steam turbine can be protected by a sacrificial barrier of aluminum. In another embodiment, other susceptible components of the steam turbine could be coated or covered with an aluminum layer or cover as would be appropriate and/or desirable.

It should be understood that any one or more of the above methods or structures for protecting or covering the parts of the steam turbine, such as the nozzle block bolts, can be used in combination as desired to achieve different and varying degrees of protection. For example, in one embodiment, the bolt could first be coated with aluminum, then wrapped at least partially in wire. In another embodiment, a nickel alloy cap could cover the bolt head, while at least a portion of the threading could have aluminum foil wrapped around it. All other combinations should be understood as being within the scope of the present application.

The selection of a sacrificial metal must satisfy two constraints: first, it must react readily with sodium hydroxide; and second, it must not react too fast or too quickly with steam. Aluminum meets these two constraints, but it should be understood that there may be metals other than aluminum that meet these constraints as well. Not all metals meet these two constraints. Zinc, for instance, does not meet the second constraint as it would react with the steam.

Referring now to the Figures, FIG. 1 shows an embodiment of a steam turbine 10 having a nozzle block 12. For installation and assembly, the rotor 16 can be removed and the nozzle block 12 may be lowered into position within the nozzle chamber casing 14. A clamping structure 18 can then be positioned against the nozzle block 12 and be held in position by a plurality of bolts 20 that are in threaded engagement with threaded holes in the nozzle chamber casing 14. The bolts 20 are passed through counterbored holes in the clamping structure 18. Each of the holes has a counterbored portion 37 to accommodate the head of the bolt 20 and a narrower portion 38 to accommodate the shank of the bolt 20. The head of the bolt 20 is retained by or clamps against a shoulder surface at the transition between the counterbored portion 37 and the narrower portion 38 of the hole. The clamping structure 18 has a groove 22 for receiving the inner arcuate portion 24 of nozzle block 12 and for urging inner sealing surfaces 26, 27 against respective mating sealing surfaces 28, 29 of the casing when the bolts 20 are tightened. Outer arcuate portion 30 of the nozzle block 12 is received by a groove 32 formed in the nozzle chamber casing 14. When the bolts 20 are tightened, the outer sealing surface 34 of the nozzle block 12 is pressed against sealing surface 36 of the nozzle chamber casing 14, thereby providing a seal against steam bypass around the nozzle block 12. The nozzle block 12 and the clamping structure 18 together form a nozzle block assembly 13. In another embodiment, the clamping structure 18 is incorporated into the nozzle block 12 as a one-piece structure.

Figure 2:
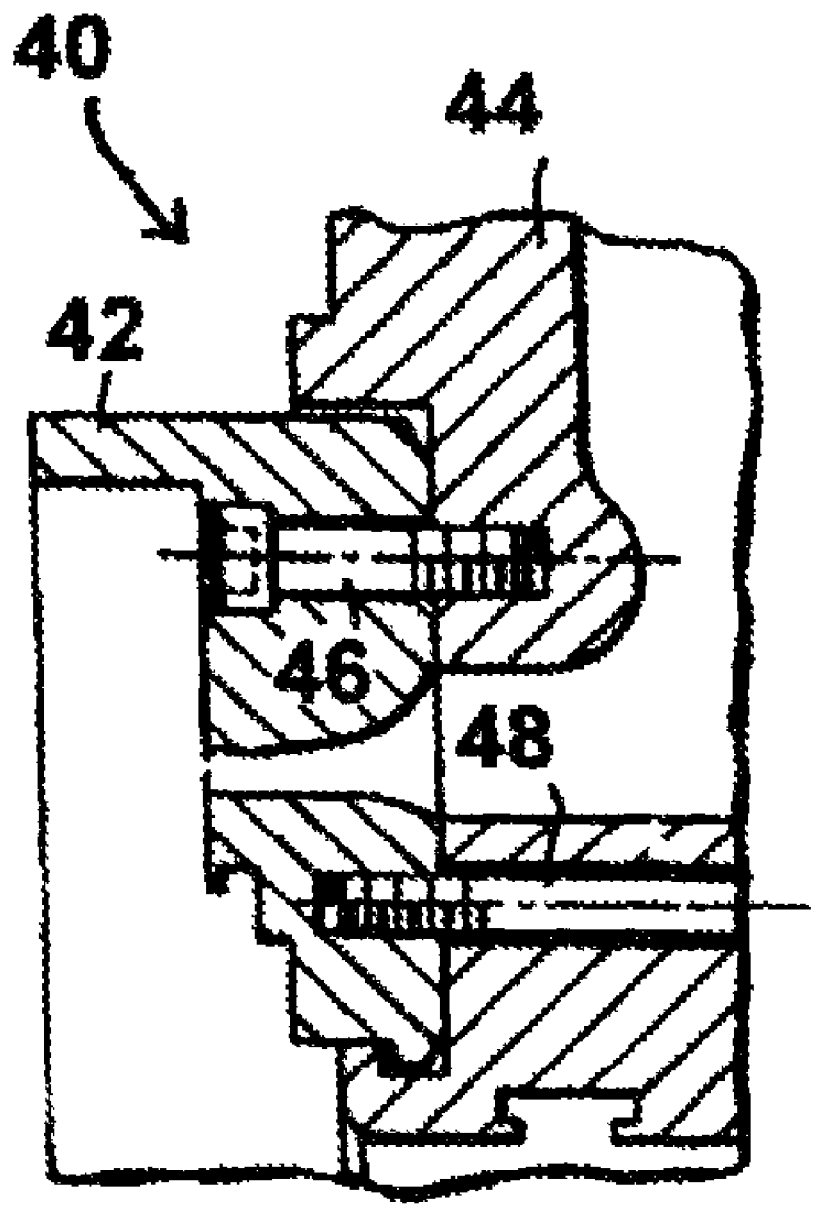
FIG. 2 shows a partial sectional view of a steam turbine with another bolted block assembly.

FIG. 2 shows another embodiment of a nozzle block assembly 40 for a steam turbine. The nozzle block 42 is secured to the nozzle chamber casing 44 by a first plurality of threaded bolts 46 and a second plurality of threaded bolts 48 with their bolt heads not shown and being outside the figure.

Although each of the embodiments shown in FIGS. 1 and 2 are designed to minimize the bypass of steam between contacting surfaces of the various components, some steam may pass between the surfaces because of the pressures in the steam turbine. The steam thus contacts many surfaces and components in the steam turbine. In the event that the steam contains a contaminant, such as sodium hydroxide, the surfaces or components could possibly be damaged or corroded, depending on the material construction of the surfaces or components. The bolts 20, 46, 48 shown in FIGS. 1 and 2 may be made from high strength materials that are susceptible to the corrosive effects of sodium hydroxide. One way to counteract or reduce such corrosive effects and extend the life of the bolts is to utilize a sacrificial barrier, or getter, made of a material such as metallic aluminum, as discussed herein above.

Figure 3:
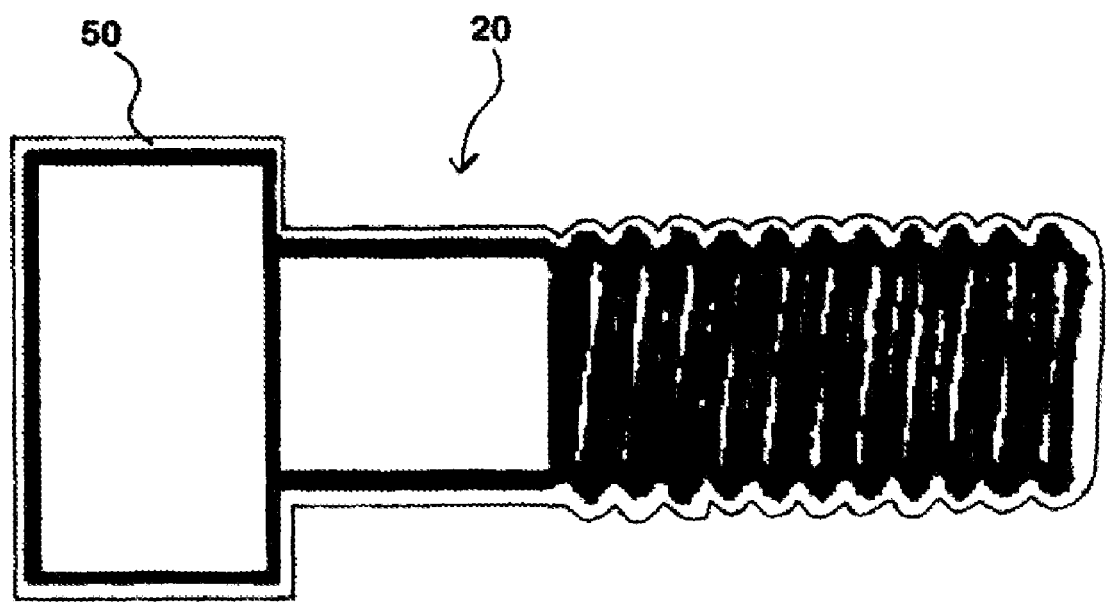
FIG. 3 shows an expanded view of the threaded bolt with a sacrificial barrier.

FIG. 3 shows an expanded view of the threaded bolt 20 with a sacrificial barrier in the form of an aluminum coating 50. The aluminum coating 50 coats the entirety of the threaded bolt 20. However, it should be understood that the coating 50 may alternatively be applied to cover just a portion of the threaded bolt 20, such as only the head, the shank portion between the head and the threaded portion, or the threaded portion.

Figure 4:
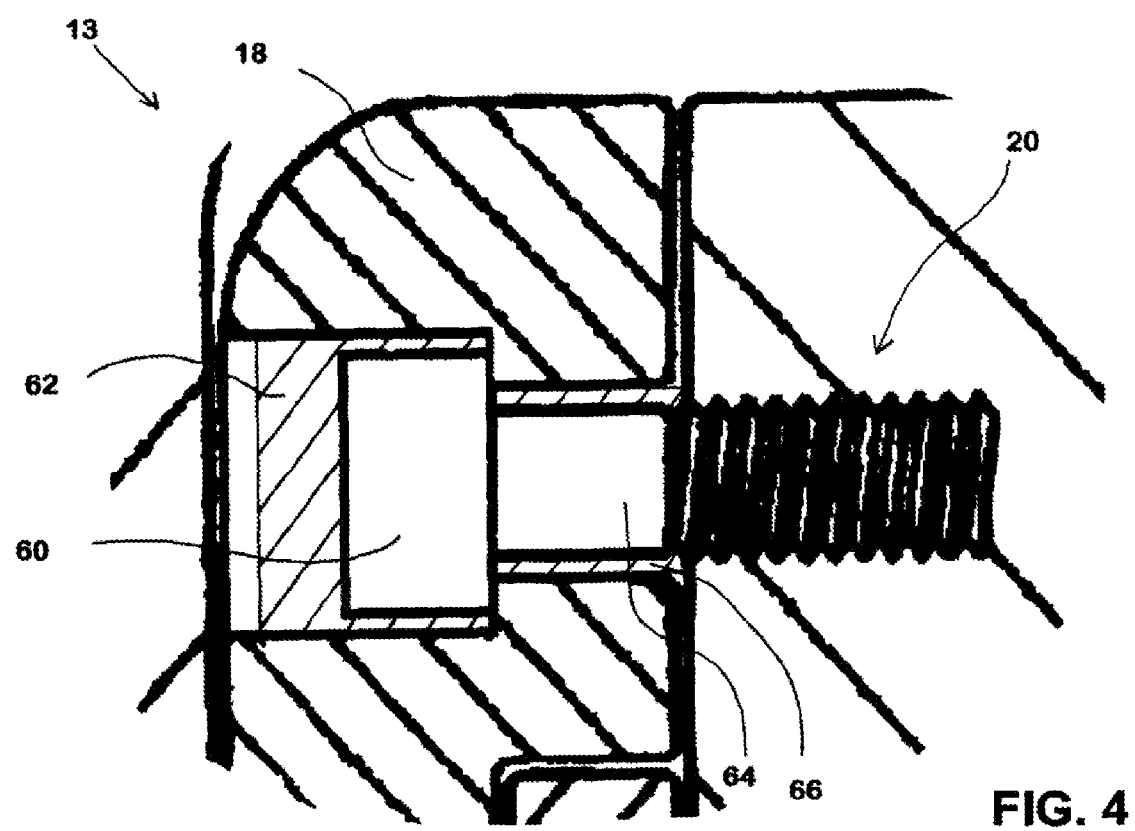
FIG. 4 shows an expanded view of an embodiment of a portion of the bolted nozzle block assembly shown in FIG. 1.

FIG. 4 shows an expanded view of an embodiment of a portion of the bolted nozzle block assembly 13 shown in FIG. 1. In the embodiment shown, the head 60 of the threaded bolt 20 is enclosed or covered by a cap 62 that fits snugly into the recess or space around the head 60 between the head 60 and the clamping structure 18, which cap 62 could be made of aluminum, nickel, or alloys thereof, or other suitable metals, metal alloys, and materials. As discussed herein above, the cap 62 is sized to promote a friction fit on one hand between the inner surface of the cap 62 and the outer surface of the bolt head 60, and on the other hand between the inner surface of the clamping structure 18 and the outer surface of the cap 62. In one embodiment, the cap 62, for example, could be slightly oversized and forced or hammered in between the bolt head 60 and the clamping structure 18 in a friction or deformation fit. In another embodiment not shown, the outer dimensions of the bolt head 60 could match the inner dimensions of the recess, such that there is essentially no space or gap between the bolt head 60 and the walls of the recess. In such an embodiment, the cap 62 would not have a recess therein and would be placed into the space in the recess above the bolt head 60, possibly with its bottom surface flush against the top of the bolt head 60.

In another embodiment, the outer surface of the bolt head 60 and the inside of the cap 62 could each have a threading. The cap 62 could then be screwed onto the bolt head 60. Alternatively or in conjunction with the threading on the inside of the cap 62, the cap 62 could have a threading on its outside surface which is designed to be screwed into a threading on the inside of the clamping structure 18.

In addition, the shank portion 64 of the bolt 20 is wrapped in a layer or layers of aluminum foil 66, although other protective coverings could be used in other embodiments as discussed herein.

Figure 5:
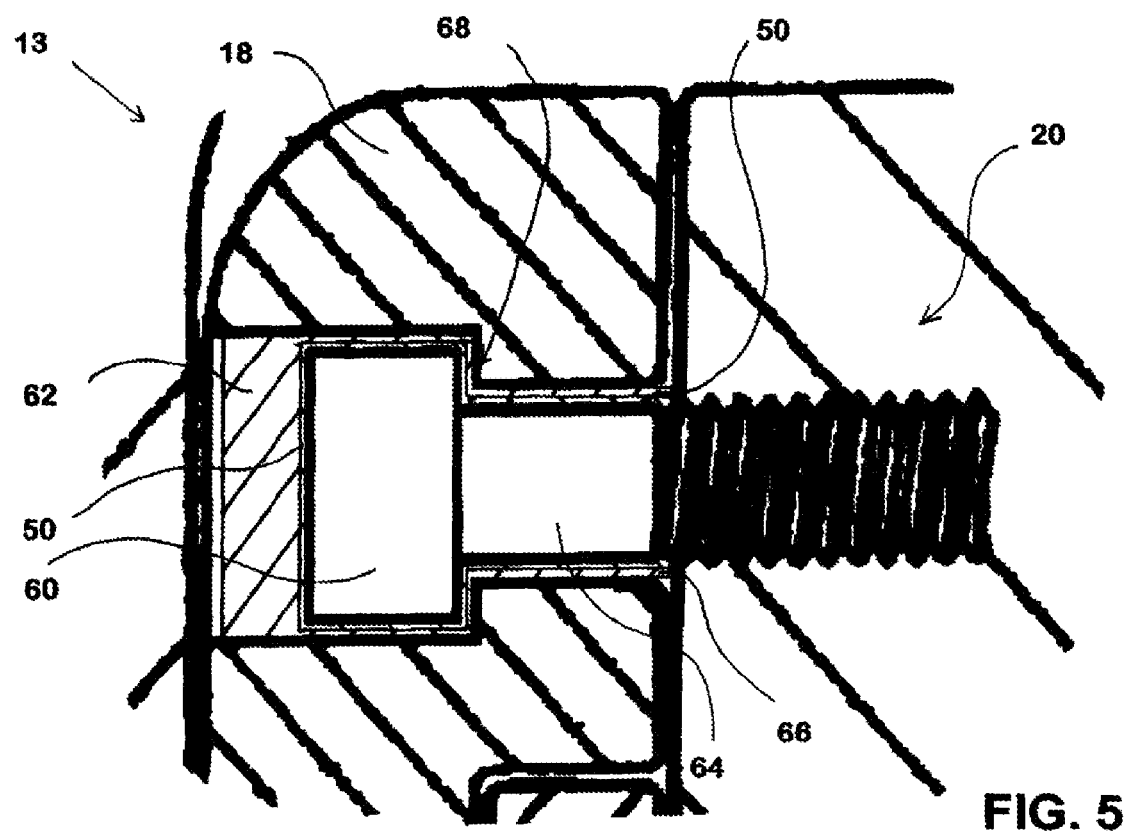
FIG. 5 shows an embodiment similar to that shown in FIG. 4, but which utilizes a bolt similar to that shown in FIG. 3.

FIG. 5 shows an embodiment similar to that shown in FIG. 4, but which utilizes an aluminum-coated bolt 20, similar to that shown in FIG. 3. In this particular embodiment, the bolt 20 is first coated with aluminum 50 on at least the portion of the bolt 20 that will not be screwed into the nozzle chamber casing 14. This coated portion encompasses the head 60, the shank portion 64, and a portion of the threading that is adjacent the shank portion 64 and the entry to the threaded opening in the nozzle chamber casing 14. In another embodiment, the protective layer could be applied to a small portion of the threading adjacent the shank portion 64 to protect the threading at the entry or mouth of the threaded opening in the nozzle chamber casing 14. Alternatively, the entire threaded bolt 20 could be coated as shown in FIG. 3. As in FIG. 4, the shank portion 64 is wrapped in aluminum foil 66. In addition, the aluminum foil 66 is also layered or applied on the underside of the bolt head 60 between the head 60 and a shoulder portion 68 of the clamping structure 18. In an alternative embodiment, this additional layer of aluminum foil 66 could be omitted or omitted from the bearing surfaces and only the coating 50 will be located between the underside of the head 60 and the shoulder portion 68. The cap 62 is fitted onto the head 60 over the coating 50. In this embodiment, the coating 50 therefore provides an additional layer of protection beyond that afforded by the cap 62 and the foil 66.

Figure 6:
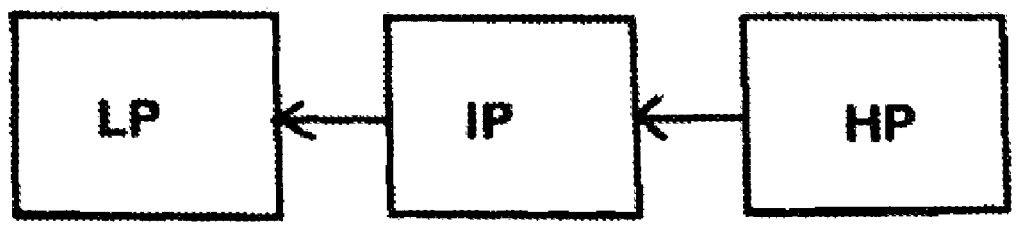
FIG. 6 shows a block diagram of some sections of a steam turbine.

FIG. 6 shows a block diagram of some sections of a steam turbine. Specifically, FIG. 6 shows a high pressure section HP, an intermediate pressure section IP, and a low pressure section LP. In operation of the steam turbine, steam is passed first through the high pressure section HP to drive the rotor by applying a force to the rotor blades, which steam is at a high temperature and under a high pressure. As the steam expands through the blade path and exits the high pressure section HP, the temperature and pressure are reduced and the steam is then conducted to the intermediate pressure section IP (usually after the steam is reheated). As in the high pressure section, the steam passes through the intermediate pressure section IP and drives the rotor therein, but at a reduced pressure and possibly temperature compared to that of the high pressure section HP. The steam experiences a further reduction of pressure and temperature as it exits the intermediate pressure section IP and is then conducted to the low pressure section LP. The steam is now passed through the low pressure section LP to drive the rotor therein.

Figure 7:
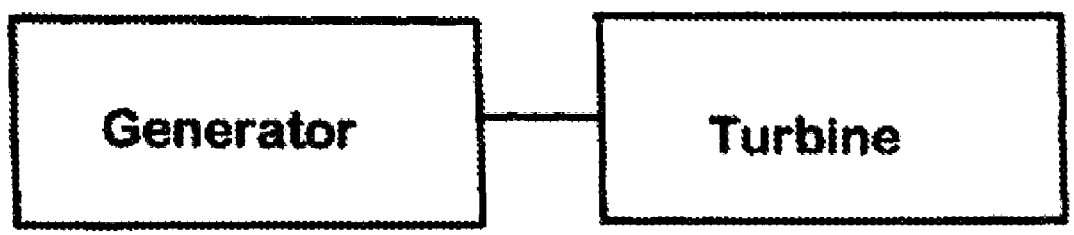
FIG. 7 shows a block diagram of some sections of a steam turbine system.

FIG. 7 shows a block diagram of some sections of a steam turbine system. FIG. 7 shows a generator connected to a steam turbine. The steam turbine is operated to supply mechanical power to the generator of an electrical power plant, for example, to generate electric power, which is then directed to users.

Figure 8:
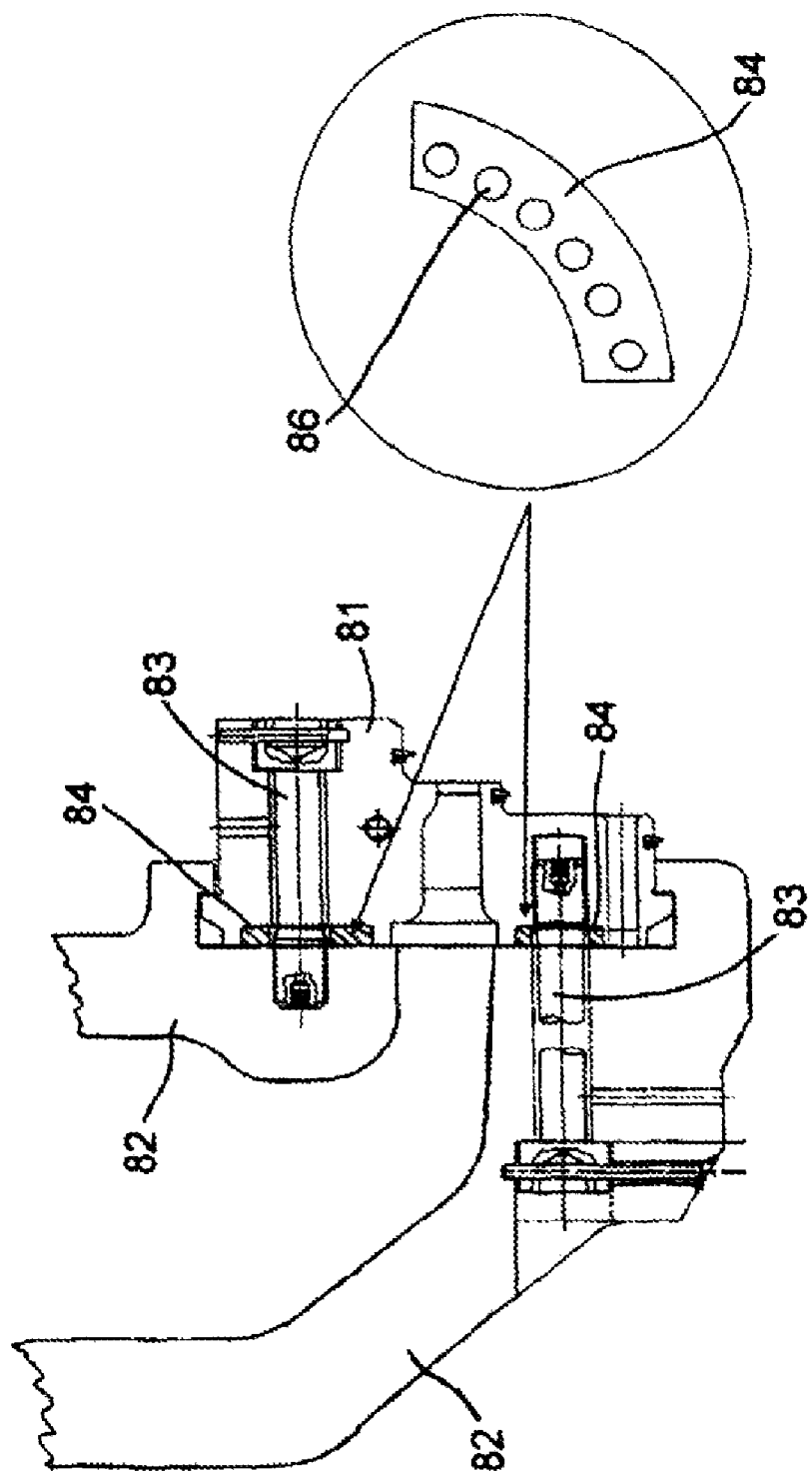
FIG. 8 shows two protective gaskets in a nozzle block assembly.
Figure 9:
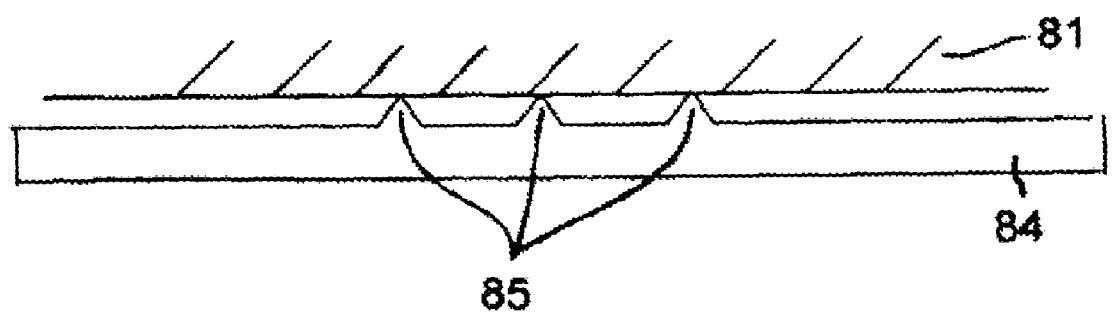
FIG. 9 shows a cross-section of a portion of an embodiment of a protective gasket.

FIG. 8 shows two protective gaskets 84, which, in at least one embodiment, are made of aluminum, placed in annular grooves in the nozzle block 81 and clamped between the nozzle block 81 and the nozzle chamber 82 so that the sodium hydroxide cannot readily pass through the gaskets 84 and attack the nozzle block bolts 83. The gaskets 84 may be crush-type or deformable gaskets similar to o-rings, or may be gaskets with relatively sharp structures 85, such as projections from the surface of the gaskets 84, as can be seen in FIG. 9, that would crush or deform when the nozzle block 81 is bolted to the nozzle chamber 82. The gaskets 84 have holes 86 therein which correspond to each of the bolts 83 and thereby surround each bolt 83 with a protective material, such as aluminum.

Figure 10:
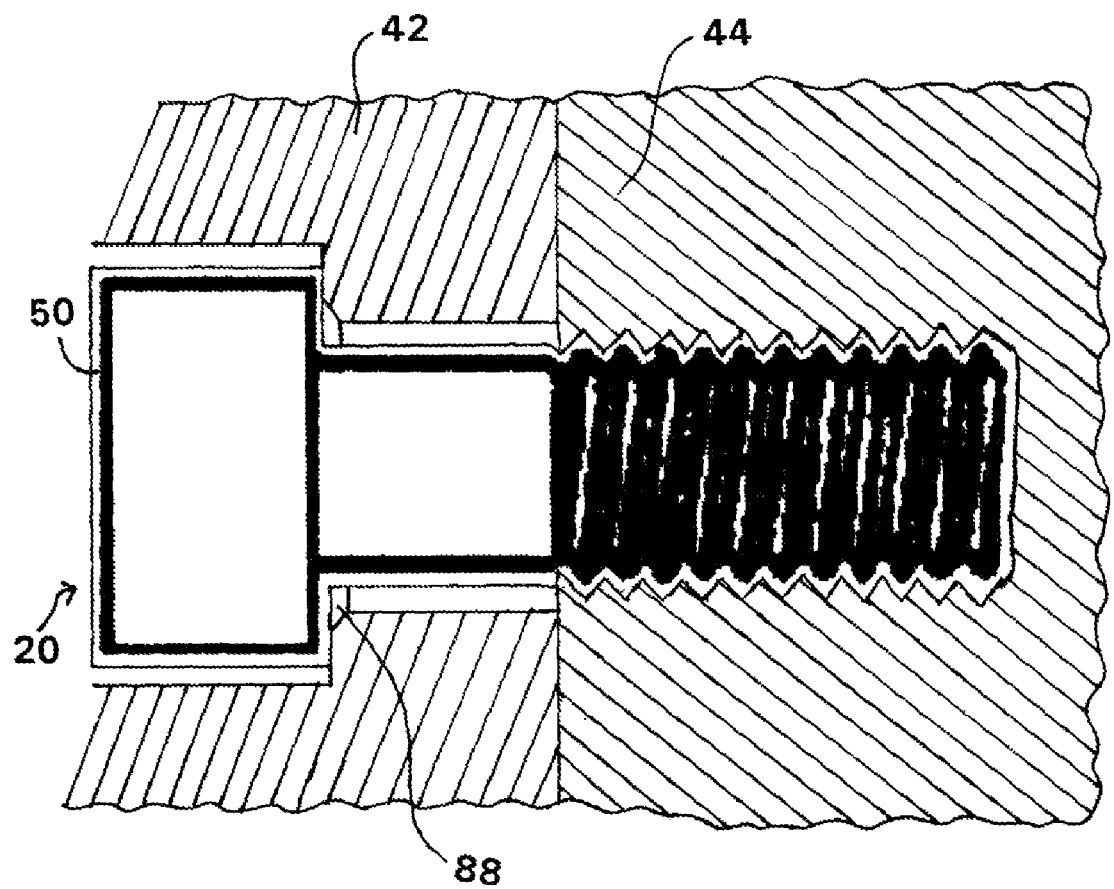
FIG. 10 shows a washer after installation of the bolt in a nozzle block assembly.

FIG. 10 shows a washer 88 disposed about the shaft of the bolt 20 near the bolt head after installation of the bolt 20 in a nozzle block assembly. The nozzle block 42 has a shoulder area which the washer 88 is seated against. After installation of the bolt 20, the washer 88 is deformed by being pressed or crushed between the shoulder of the nozzle block 42 and the underside of the head of the bolt 20. The washer 88, in at least one possible embodiment, is made of aluminum.

Figure 11:
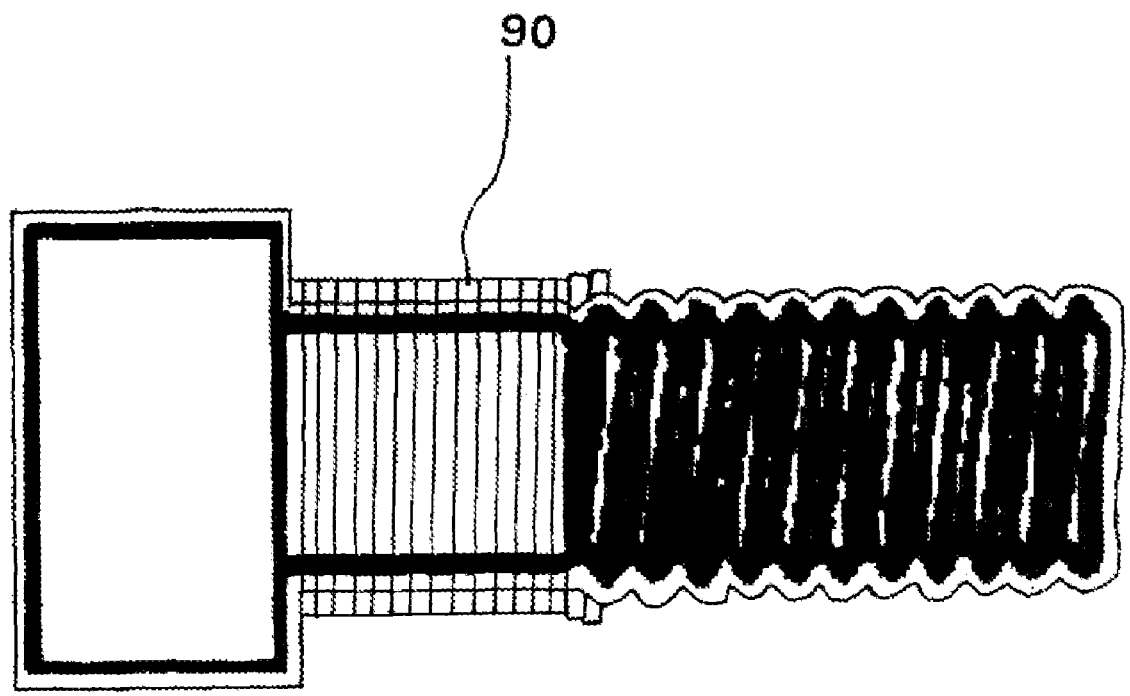
FIG. 11 shows a wire on the bolt prior to the installation of the bolt in a nozzle block assembly.

FIG. 11 shows a wire 90 wound around the shaft of the bolt and at least one of the threads of the threaded portion prior to the installation of the bolt in a nozzle block assembly. In one embodiment, the wire can be shaped similarly to a bass piano string or wound guitar string. In another embodiment, the wire can be a flat wire. In another possible embodiment, the wire can be made of aluminum.

Figure 12:
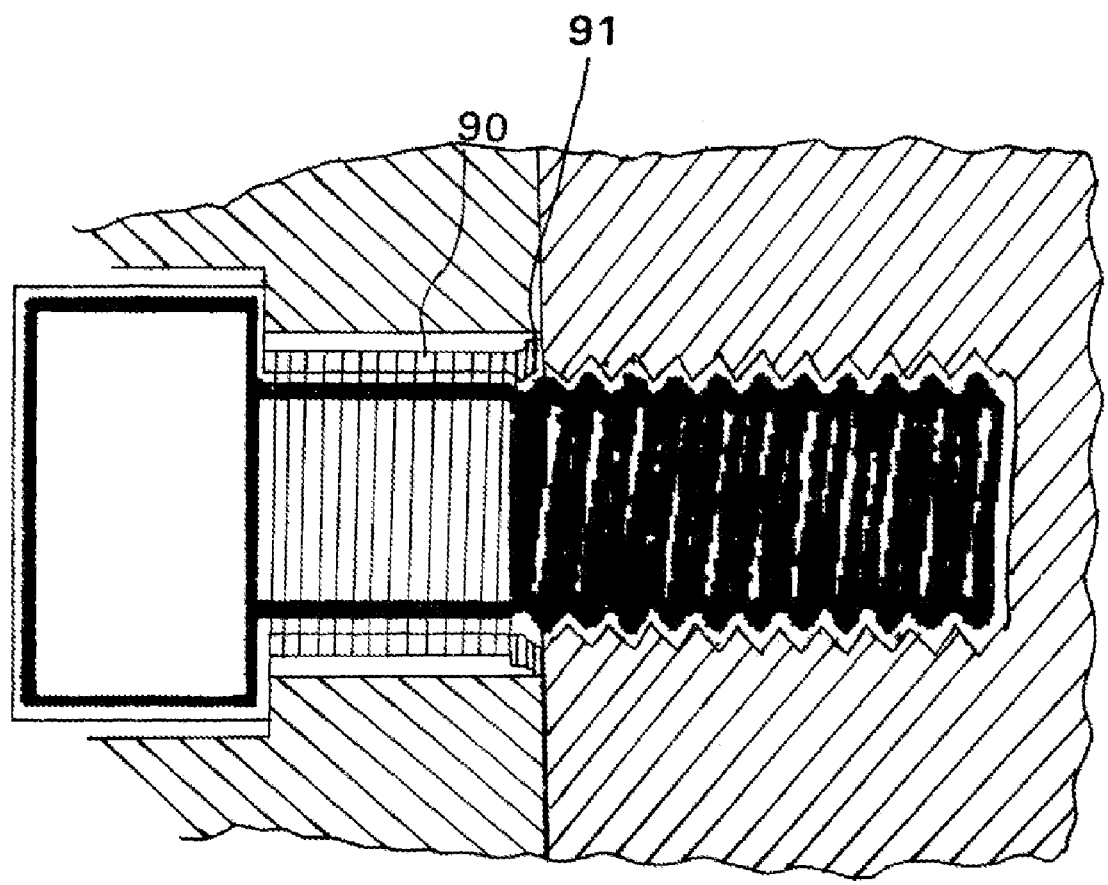
FIG. 12 shows the wire on the bolt after installation of the bolt in a nozzle block assembly.

FIG. 12 shows the wire 90 on the bolt after installation of the bolt in a nozzle block assembly. As shown in the figure, the portion 91 of the wire 90 nearest the threaded hole is compressed, crushed, or deformed against the surface of the nozzle chamber casing about the threaded bolt hole.

The embodiments described herein above are not to be taken as limiting the embodiments of the invention to all of the provided details thereof, since modifications and variations thereof may be made without departing from the spirit and scope of the embodiments of the invention.

What is claimed is:

1. A method of increasing service interval periods in a steam turbine, upon sodium hydroxide contaminated water being injected into the steam cycle thereby producing steam contaminated with sodium hydroxide, by reducing an amount of sodium hydroxide in the steam in a relatively high temperature and relatively high pressure portion of said steam turbine by modifying a nozzle block assembly mounted to a stationary portion in said steam turbine, wherein said nozzle block assembly comprises a nozzle block comprising flow passages for guiding a flow of the steam from a nozzle chamber to a first row of rotating steam turbine blades, said nozzle block having a plurality of counterbored holes disposed therein; a plurality of bolts passing through said counterbored holes to fasten said nozzle block to said stationary portion of said steam turbine, and each of said bolts comprising a head portion, a threaded portion, and a shank portion between said head portion and said threaded portion, said method comprising:

applying a sacrificial component comprising a protective aluminum covering over at least one thread of said threaded portion of at least one of said bolts proximate said shank portion, said sacrificial component is a metallic aluminum component and is positioned in a gap between an outer surface of said bolt and a surface of at least one of said nozzle block and said stationary portion of said steam turbine to both prevent passage of said steam through said gap and to convert at least a portion of the sodium hydroxide into an aluminum compound effective to neutralize the portion of the sodium hydroxide in the steam at said portion of said nozzle block assembly adjacent said bolts so as to reduce stress corrosion cracking of said bolts during steam turbine operation over a substantial number of hours of operation of said steam turbine, and for limiting production of said aluminum compound effective to reduce deposition of said aluminum compound on portions of said steam turbine downstream of said nozzle block assembly.

2. The method according to claim 1, wherein:
said nozzle block bolts are disposed away from said flow passages away from a direct flow of steam exiting from said flow passages;
said aluminum compound contains oxygen; and
said protective aluminum covering comprises a surface configured to react with sodium hydroxide in the steam sufficient to neutralize at least a portion of the sodium hydroxide in said portion of the steam flowing adjacent said bolts to minimize breakage of bonds between grains in the material of said bolts at the region of maximum stress on said bolts over a substantial number of hours of operation of said steam turbine.

3. The method according to claim 2, wherein:
said head portion of each of said bolts has a diameter greater than both a diameter of said threaded portion and a diameter of said shank portion;
said threaded portion is screwed into a corresponding threaded opening in said stationary portion of said steam turbine to attach said nozzle block assembly to said stationary portion;
said protective aluminum covering is sufficient to reduce breakage of bonds between grains in the material of said bolts to substantially less than a few milligrams of said bolt material; and
said protective aluminum covering comprises at least one of:
an aluminum coating or plating disposed on at least one thread of said threaded portion adjacent said shank portion of at least one of said bolts;
an aluminum foil wrapped around at least one thread of said threaded portion adjacent said shank portion of at least one of said bolts; and
an aluminum wire wound around at least one thread of said threaded portion adjacent said shank portion of at least one of said bolts.

4. The method according to claim 3, wherein:
said nozzle block assembly comprises a plurality of protective caps, the outer dimensions of which correspond to the inner dimensions of said counterbored holes in said nozzle block assembly to promote a friction fit to hold said caps in said counterbored holes;
each of said protective caps is disposed in a corresponding counterbored hole and adjacent said head portion of a corresponding bolt to seal said holes for limiting entry of the steam contaminated with sodium hydroxide into said holes to protect said bolts from the sodium hydroxide; and
each of said protective caps comprises at least one of: aluminum, nickel, and alloys thereof.

5. The method according to claim 4, wherein:
each of said caps has a recess therein, the inner dimensions of which recesses correspond to the outer dimensions of said bolt heads; and
each of said caps is disposed on and about a corresponding bolt head, wherein the portion of said caps around said recess in each of said caps is wedged between the inner surface of said counterbored hole and the exterior side surface of said bolt head.

6. A method of increasing service interval periods in a steam turbine, upon alkali metal hydroxide contaminated water being injected into the steam cycle thereby producing steam contaminated with at least one alkali metal hydroxide, by reducing an amount of the alkali metal hydroxide in the steam in a relatively high temperature and relatively high pressure portion of said steam turbine and converting at least one alkali metal hydroxide in contaminated steam into a non-corrosive compound by modifying a nozzle block assembly mounted to a stationary portion in said steam turbine, wherein said nozzle block assembly comprises a nozzle block comprising flow passages for guiding a flow of the steam from a nozzle chamber to a first row of rotating steam turbine blades; said nozzle block having a plurality of holes disposed therein; a plurality of bolts passing through said holes to fasten said nozzle block to said stationary portion of said steam turbine; and each of said bolts comprising at least a head portion and a threaded portion; said method comprising:

positioning a sacrificial component proximate at least one of said bolts, said sacrificial component is a metallic aluminum component and is positioned in a gap located outwardly from an outer surface of said at least one bolt to both prevent passage of said steam through said gap and to convert at least a portion of the at least one alkali metal hydroxide into an aluminum compound effective to neutralize at least a portion of the at least one alkali metal hydroxide in the steam at a location in said gap distal from said outer surface of said at least one bolt so as to reduce stress corrosion cracking of said at least one bolt during steam turbine operation over a substantial number of hours of operation of said steam turbine.

7. The method according to claim 6, wherein:
said nozzle block bolts are disposed away from said flow passages and away from a direct flow of steam exiting from said flow passages;
said aluminum compound contains oxygen; and
said sacrificial component is configured for limiting production of said at least one alkali metal hydroxide in said portion of the steam flowing adjacent said bolts, and for limiting production of said aluminum compound effective to reduce deposition of said aluminum compound on portions of said steam turbine downstream of said nozzle block assembly.

8. The method according to claim 7, wherein:
said head portion of each of said bolts has a diameter greater than both a diameter of said threaded portion and a diameter of said shank portion;
said threaded portion is screwed into a corresponding threaded opening in said stationary portion of said steam turbine to attach said nozzle block assembly to said stationary portion;
said aluminum sacrificial component comprises at least one of:
  an aluminum foil wrapped around at least one thread of said threaded portion adjacent said shank portion of at least one of said bolts;
  an aluminum wire wound around at least one thread of said threaded portion adjacent said shank portion of at least one of said bolts;
  an aluminum washer disposed around at least a portion of said shank portion of at least one of said bolts; and
  an annular aluminum gasket disposed and clamped between said nozzle block and said stationary portion of said steam turbine, wherein said aluminum gasket has a plurality of holes therein to permit said plurality of bolts to pass therethrough.

9. The method according to claim 8, wherein:
said plurality of holes in said nozzle block assembly comprises counterbored holes;
said sacrificial component comprises a plurality of protective caps, the outer dimensions of which correspond to the inner dimensions of said counterbored holes in said nozzle block assembly to promote a friction fit to hold said caps in said counterbored holes;
each of said protective caps is disposed in a corresponding counterbored hole and adjacent said head portion of a corresponding bolt to seal said holes for limiting entry of the steam contaminated with said at least one alkali metal hydroxide into said holes to protect said bolts from said at least one alkali metal hydroxide; and
each of said protective caps comprises a material which is substantially reactive to said at least one alkali metal hydroxide.

10. The method according to claim 9, wherein:
each of said protective caps comprises at least one of: aluminum, nickel, and alloys thereof;
each of said caps has a recess therein, the inner dimensions of which recesses correspond to the outer dimensions of said bolt heads; and
each of said caps is disposed on and about a corresponding bolt head, wherein the portion of said caps around said recess in each of said caps is wedged between the inner surface of said counterbored hole and the exterior side surface of said bolt head.

11. The method according to claim 7, wherein:
said head portion of each of said bolts has a diameter greater than both a diameter of said threaded portion and a diameter of said shank portion;
said threaded portion is screwed into a corresponding threaded opening in said stationary portion of said steam turbine to attach said nozzle block assembly to said stationary portion;
said plurality of holes in said nozzle block assembly comprises counterbored holes;
said sacrificial component comprises an aluminum washer disposed around at least a portion of said shank portion of at least one of said bolts;
said aluminum washer is deformed or crushed by said bolt head against a bearing surface of a corresponding counterbored hole upon installation of said bolt;
said sacrificial component further comprises a protective aluminum covering over at least one thread of said threaded portion of at least one of said bolts adjacent said shank portion;
said protective aluminum covering comprises at least one of:
  an aluminum coating or plating disposed on at least one thread of said threaded portion adjacent said shank portion of at least one of said bolts;
  an aluminum foil wrapped around at least one thread of said threaded portion adjacent said shank portion of at least one of said bolts; and
  an aluminum wire wound around at least one thread of said threaded portion adjacent said shank portion of at least one of said bolts;
said nozzle block assembly comprises a plurality of protective caps, the outer dimensions of which correspond to the inner dimensions of said counterbored holes in said nozzle block assembly to promote a friction fit to hold said caps in said counterbored holes;
each of said protective caps is disposed in a corresponding counterbored hole and adjacent said head portion of a corresponding bolt to seal said holes for limiting entry of steam contaminated with said at least one alkali metal hydroxide into said holes to protect said bolts from said at least one alkali metal hydroxide; and
each of said protective caps comprises at least one of: aluminum, nickel, and alloys thereof.

12. The method according to claim 7, wherein:
said head portion of each of said bolts has a diameter greater than both a diameter of said threaded portion and a diameter of said shank portion;
said threaded portion is screwed into a corresponding threaded opening in said stationary portion of said steam turbine to attach said nozzle block assembly to said stationary portion;
said sacrificial component comprises an annular aluminum gasket disposed and clamped between said nozzle block and said stationary portion of said steam turbine, which said aluminum gasket has a plurality of holes therein to permit said plurality of bolts to pass therethrough;
said sacrificial component further comprises a protective aluminum covering over at least one thread of said threaded portion of at least one of said bolts adjacent said shank portion;
said protective aluminum covering comprises at least one of:
an aluminum coating or plating disposed on at least one thread of said threaded portion adjacent said shank portion of at least one of said bolts;
an aluminum foil wrapped around at least one thread of said threaded portion adjacent said shank portion of at least one of said bolts; and
an aluminum wire wound around at least one thread of said threaded portion adjacent said shank portion of at least one of said bolts;
said plurality of holes in said nozzle block assembly comprises counterbored holes;
said nozzle block assembly comprises a plurality of protective caps, the outer dimensions of which correspond to the inner dimensions of said counterbored holes in said nozzle block assembly to promote a friction fit to hold said caps in said counterbored holes;
each of said protective caps is disposed in a corresponding counterbored hole and adjacent said head portion of a corresponding bolt to seal said holes for limiting entry of the steam contaminated with said at least one alkali metal hydroxide into said holes to protect said bolts from said at least one alkali metal hydroxide; and
each of said protective caps comprises at least one of: aluminum, nickel, and alloys thereof.

13. The method according to claim 7, wherein:
said head portion of each of said bolts has a diameter greater than both a diameter of said threaded portion and a diameter of said shank portion;
said threaded portion is screwed into a corresponding threaded opening in said stationary portion of said steam turbine to attach said nozzle block assembly to said stationary portion; and
said sacrificial component comprises at least two of:
an aluminum coating or plating disposed on at least one thread of said threaded portion adjacent said shank portion of at least one of said bolts;
an aluminum foil wrapped around at least one thread of said threaded portion adjacent said shank portion of at least one of said bolts;
an aluminum wire wound around at least one thread of said threaded portion adjacent said shank portion of at least one of said bolts;
an aluminum washer disposed around at least a portion of said shank portion of at least one of said bolts; and
an annular aluminum gasket disposed and clamped between said nozzle block and said stationary portion of said steam turbine, which said aluminum gasket has a plurality of holes therein to permit said plurality of bolts to pass therethrough.

14. A steam turbine nozzle block assembly comprising:
a nozzle block comprising a plurality of vanes defining flow passages for guiding steam from a nozzle chamber passage to a first row of rotating steam turbine blades; and a plurality of holes;
a plurality of bolts for passing through said holes to fasten said nozzle block to a stationary portion of a steam turbine; each of said bolts comprising a head portion, a threaded portion, and a shank portion between said head portion and said threaded portion; and
a sacrificial component proximate at least one of said bolts, said sacrificial component is a metallic aluminum component and is positioned in a gap located outwardly from an outer surface of said at least one bolt and surrounding at least a portion of said at least one bolt to both substantially prevent passage of said steam through said gap and to convert a portion of alkali metal hydroxide contaminants present in the steam into an aluminum compound effective to neutralize the portion of the alkali metal hydroxide contaminants at a location in said gap distal from said outer surface of said at least one bolt.

15. The steam turbine nozzle block assembly according to claim 14, wherein:
said sacrificial component is configured for limiting production of said aluminum compound in an amount effective to reduce deposition of said aluminum compound on portions of said steam turbine downstream of said nozzle block assembly;
said nozzle block bolts are disposed a distance from said flow passages and out of the direct flow of steam exiting from said flow passages;
said head portion of each of said bolts has a diameter greater than both a diameter of said threaded portion and a diameter of said shank portion;
said threaded portion is screwed into a corresponding threaded opening in a stationary portion of a steam turbine to attach said nozzle block assembly to a stationary portion; and
said sacrificial component comprises at least one of:
a foil wrapped around at least one thread of said threaded portion adjacent said shank portion of at least one of said bolts;
a wire wound around at least one thread of said threaded portion adjacent said shank portion of at least one of said bolts;
a washer disposed around at least a portion of said shank portion of at least one of said bolts; and
an annular gasket disposed and clamped between said nozzle block and a stationary portion of a steam turbine, wherein said gasket has a plurality of holes therein to permit said plurality of bolts to pass therethrough.

16. The steam turbine nozzle block assembly according to claim 15, wherein:
said plurality of holes in said nozzle block assembly comprise counterbored holes;
said nozzle block assembly comprises a plurality of protective caps, the outer dimensions of which correspond to the inner dimensions of said counterbored holes in said nozzle block assembly to promote a friction fit to hold said caps in said counterbored holes;
each of said protective caps is disposed in a corresponding counterbored hole and adjacent said head portion of a corresponding bolt effective to seal said holes for limiting entry of the contaminated steam into said holes to protect said bolts from the alkali metal hydroxide contaminants in the steam; and each of said protective caps comprises a material which is relatively reactive to said at least one alkali metal hydroxide.

17. The steam turbine nozzle block assembly according to claim 16, wherein:
    each of said protective caps comprises at least one of: aluminum, nickel, and alloys thereof;
    each of said caps has a recess therein, the inner dimensions of which recesses correspond to the outer dimensions of said bolt heads; and
    each of said caps is disposed on and about a corresponding bolt head, wherein the portion of said caps around said recess in each of said caps is wedged between the inner surface of said counterbored hole and an exterior side surface of said bolt head.

18. The steam turbine nozzle block assembly according to claim 14, wherein:
    said sacrificial component is configured for limiting production of said aluminum compound in an amount sufficient to reduce deposition of said aluminum compound on portions of said steam turbine downstream of said nozzle block assembly;
    said nozzle block bolts are disposed away from said flow passages and away from a direct flow of steam exiting from said flow passages;
    said head portion of each of said bolts has a diameter greater than both a diameter of said threaded portion and a diameter of said shank portion;
    said threaded portion is screwed into a corresponding threaded opening in a stationary portion of a steam turbine to attach said nozzle block assembly to a stationary portion;
    said plurality of holes in said nozzle block assembly comprise counterbored holes;
    said sacrificial component comprises an aluminum washer disposed around at least a portion of said shank portion of at least one of said bolts;
    said aluminum washer is deformed or crushed by said bolt head of said at least one of said bolts against a bearing surface of a corresponding counterbored hole upon installation of said nozzle block bolts;
    said sacrificial component further comprises a protective aluminum covering over at least one thread of said threaded portion of at least one of said bolts adjacent said shank portion;
    said protective aluminum covering comprises at least one of:
        an aluminum foil wrapped around at least one thread of said threaded portion adjacent said shank portion of at least one of said bolts; and
        an aluminum wire wound around at least one thread of said threaded portion adjacent said shank portion of at least one of said bolts;
    said nozzle block assembly comprises a plurality of protective caps, the outer dimensions of which correspond to the inner dimensions of said counterbored holes in said nozzle block assembly to promote a friction fit to hold said caps in said counterbored holes;
    each of said protective caps is disposed in a corresponding counterbored hole and adjacent said head portion of a corresponding bolt to seal said holes and for limiting entry of the steam contaminated with said at least one alkali metal hydroxide into said holes to protect said bolts from said at least one alkali metal hydroxide; and
    each of said protective caps comprises at least one of: aluminum, nickel, and alloys thereof.

19. The steam turbine nozzle block assembly according to claim 14, wherein:
    said sacrificial component is configured for limiting production of said aluminum compound effective to reduce deposition of said aluminum compound on portions of said steam turbine downstream of said nozzle block assembly;
    said nozzle block bolts are disposed away from said flow passages and away from a direct flow of steam exiting from said flow passages;
    said head portion of each of said bolts has a diameter greater than both a diameter of said threaded portion and a diameter of said shank portion;
    said threaded portion is screwed into a corresponding threaded opening in a stationary portion of a steam turbine to attach said nozzle block assembly to a stationary portion;
    said sacrificial component comprises an annular aluminum gasket disposed and clamped between said nozzle block and a stationary portion of a steam turbine, which said aluminum gasket has a plurality of holes therein to permit said plurality of bolts to pass therethrough;
    said sacrificial component further comprises a protective aluminum covering over at least one thread of said threaded portion of at least one of said bolts adjacent said shank portion;
    said protective aluminum covering comprises at least one of:
        an aluminum foil wrapped around at least one thread of said threaded portion adjacent said shank portion of each of at least one bolts; and
        an aluminum wire wound around at least one thread of said threaded portion adjacent said shank portion of at least one of said bolts;
    said plurality of holes in said nozzle block assembly comprise counterbored holes;
    said nozzle block assembly comprises a plurality of protective caps, the outer dimensions of which correspond to the inner dimensions of said counterbored holes in said nozzle block assembly to promote a friction fit to hold said caps in said counterbored holes;
    each of said protective caps is disposed in a corresponding counterbored hole and adjacent said head portion of a corresponding bolt to seal said holes for limiting entry of steam contaminated with said at least one alkali metal hydroxide into said holes to protect said bolts; and
    each of said protective caps comprises one of: aluminum, nickel, and alloys thereof.

20. The steam turbine nozzle block assembly according to claim 14, wherein:
    said sacrificial component is configured for limiting production of said aluminum compound effective to reduce deposition of said aluminum components on portions of said steam turbine downstream of said nozzle block assembly;
    said nozzle block bolts are disposed away distance from said flow passages and away from a direct flow of steam exiting from said flow passages;
    said head portion of each of said bolts has a diameter greater than both a diameter of said threaded portion and a diameter of said shank portion;
    said threaded portion is screwed into a corresponding threaded opening in a stationary portion of a steam turbine to attach said nozzle block assembly to a stationary portion; and said sacrificial component comprises at least two of:
- an aluminum coating or plating disposed on at least one thread of said threaded portion adjacent said shank portion of at least one of said bolts;
- an aluminum foil wrapped around at least one thread of said threaded portion adjacent said shank portion of at least one of said bolts;
- an aluminum wire wound around at least one thread of said threaded portion adjacent said shank portion of at least one of said bolts;
- an aluminum washer disposed around at least a portion of said shank portion of at least one of said bolts; and
- an annular aluminum gasket disposed and clamped between said nozzle block and a stationary portion of a steam turbine, which said aluminum gasket has a plurality of holes therein to permit said plurality of bolts to pass therethrough.

\* \* \* \* \*